United States Patent [19]

Courts et al.

[11] 4,285,158
[45] Aug. 25, 1981

[54] TOY FOR DETECTING MAGNETIC FIELDS WITH ELECTRICAL COMPASS CONTACTS

[75] Inventors: Randall L. Courts, 18802 Dundee Ave., Saratoga, Calif. 95070; Joseph R. Wilfong, San Jose, Calif.

[73] Assignee: Randall L. Courts, Saratoga, Calif.

[21] Appl. No.: 62,245

[22] Filed: Jul. 30, 1979

[51] Int. Cl.³ .................... A63H 33/26; G01C 17/02
[52] U.S. Cl. .................. 46/227; 33/355 R; 324/260; 434/301
[58] Field of Search ........ 33/355; 200/56 R; 346/8; 46/226, 227, 238, 175 R; 35/10.21, 10.22

[56] References Cited

U.S. PATENT DOCUMENTS

| | | | |
|---|---|---|---|
| 994,677 | 6/1911 | Hennah | 33/355 |
| 1,796,988 | 3/1931 | Hand | 33/355 |
| 2,032,018 | 2/1936 | Holmes | 33/355 |
| 2,401,723 | 6/1946 | Deming | 250/395 |
| 2,813,373 | 11/1957 | Heller | 46/227 |
| 2,886,919 | 5/1959 | Glass | 46/227 |
| 3,012,368 | 12/1961 | Friedman | 46/226 |
| 3,223,412 | 12/1965 | Freeman et al. | 46/226 |
| 3,239,961 | 3/1966 | Forkner | 46/238 |
| 3,394,491 | 7/1968 | Valentine | 46/227 |
| 3,529,821 | 9/1970 | Piazza | 46/226 |
| 3,798,833 | 3/1974 | Campbell | 46/227 |
| 4,054,286 | 10/1977 | Dressler, Sr. | 46/227 |
| 4,124,110 | 11/1978 | Hovorka | 194/100 A |

Primary Examiner—Gene Mancene
Assistant Examiner—Michael J. Foycik, Jr.
Attorney, Agent, or Firm—Phillips, Moore, Weissenberger, Lempio & Majestic

[57] ABSTRACT

A toy including a housing having a front panel, a compass having a magnetic needle mounted on the panel, a pair of LED's on opposite sides of the compass, a sound alarm on the panel, and an electronic circuit, having a pair of contacts, which energizes one of the LED's and the sound alarm in response to the needle being pivoted in one direction to close one of the contacts, and which energizes the other LED and the sound alarm in response to the needle being pivoted in the other direction to close the other contact. The needle is pivoted by strategically positioned bar magnets external of the toy. The electronic circuit can be manually reset or automatically reset after a predetermined period.

6 Claims, 6 Drawing Figures

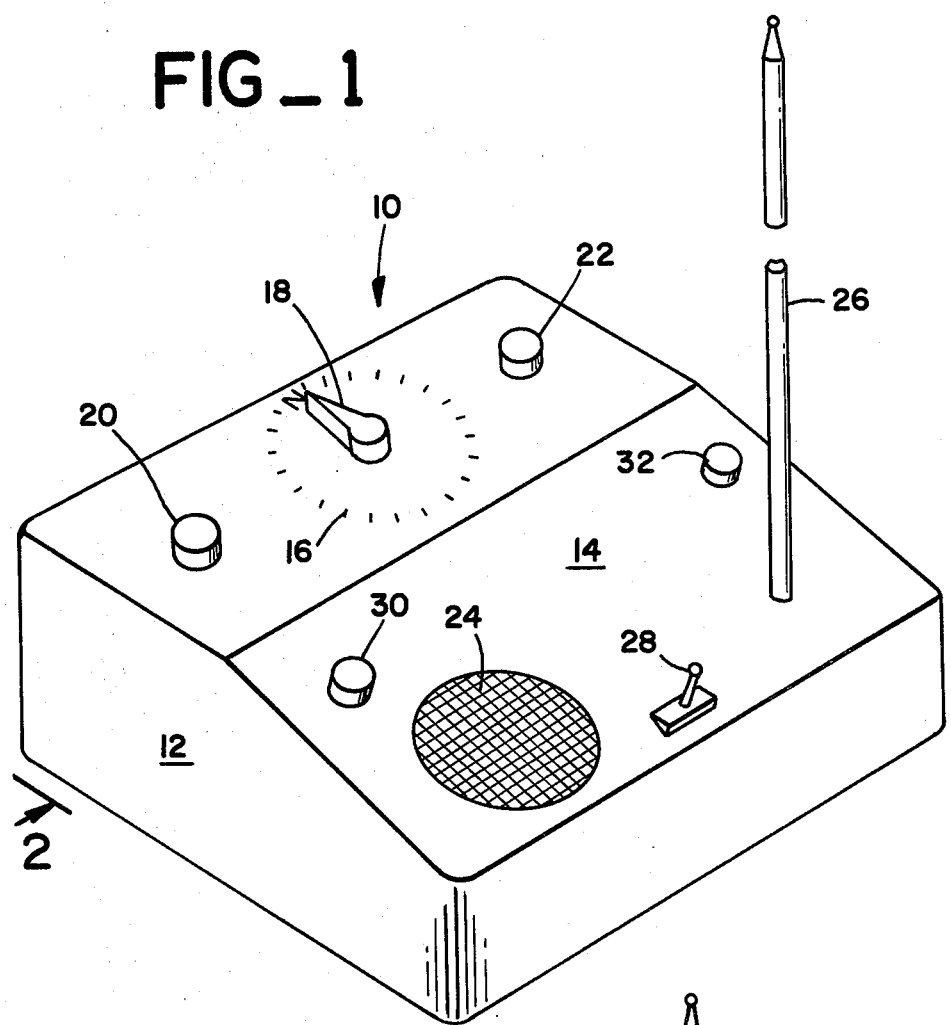
FIG_1
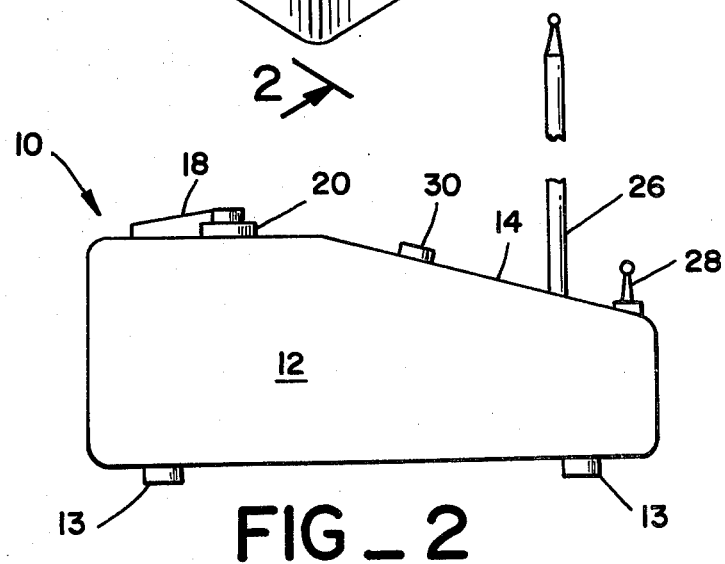
FIG_2

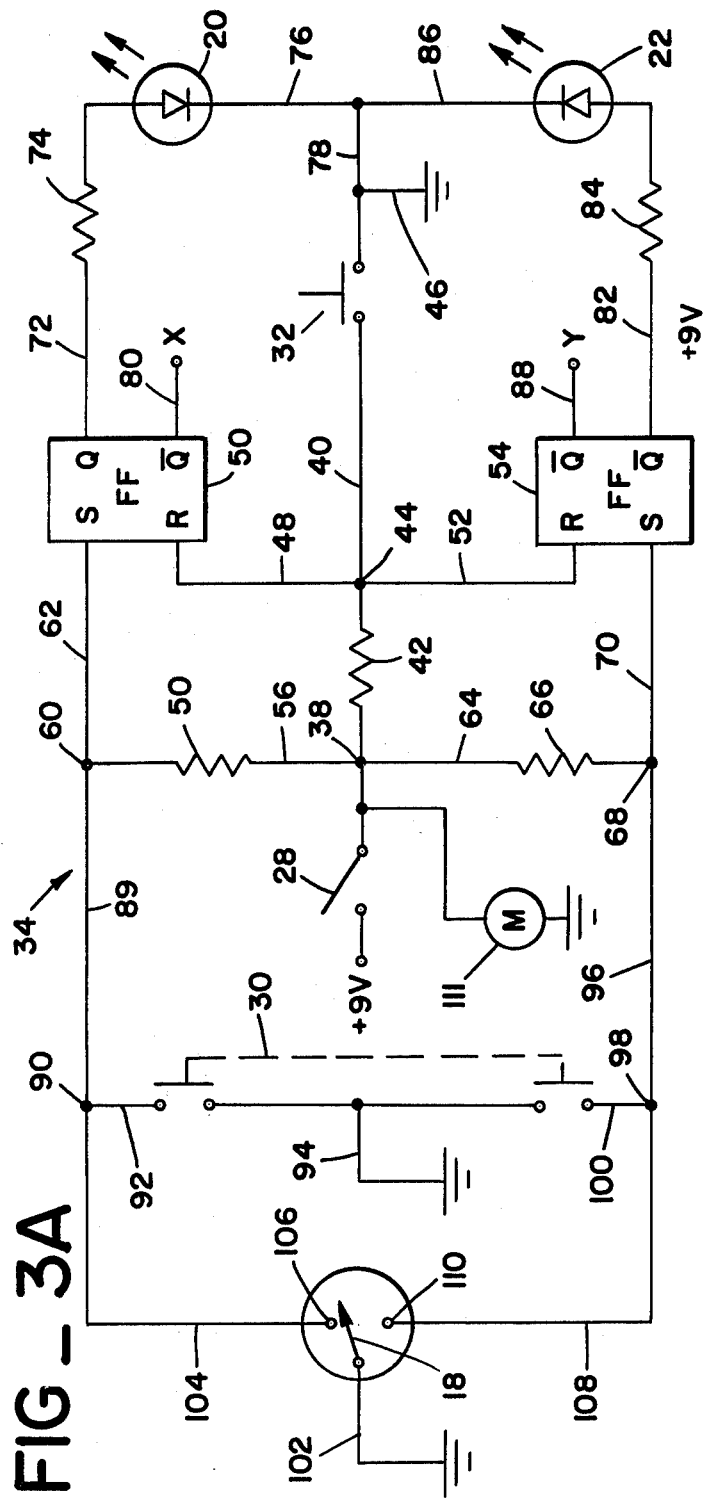
FIG_3A
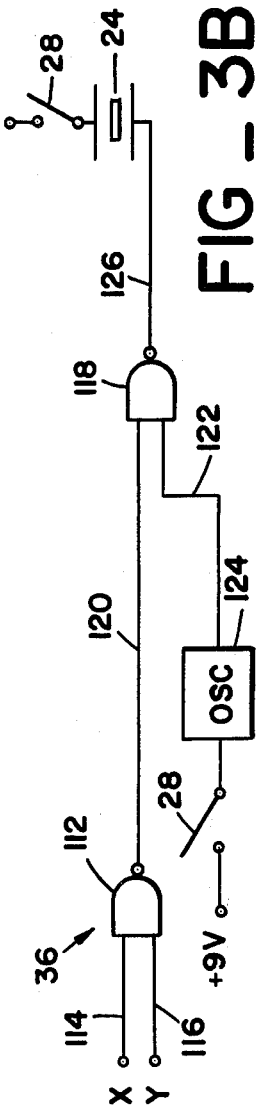
FIG_3B

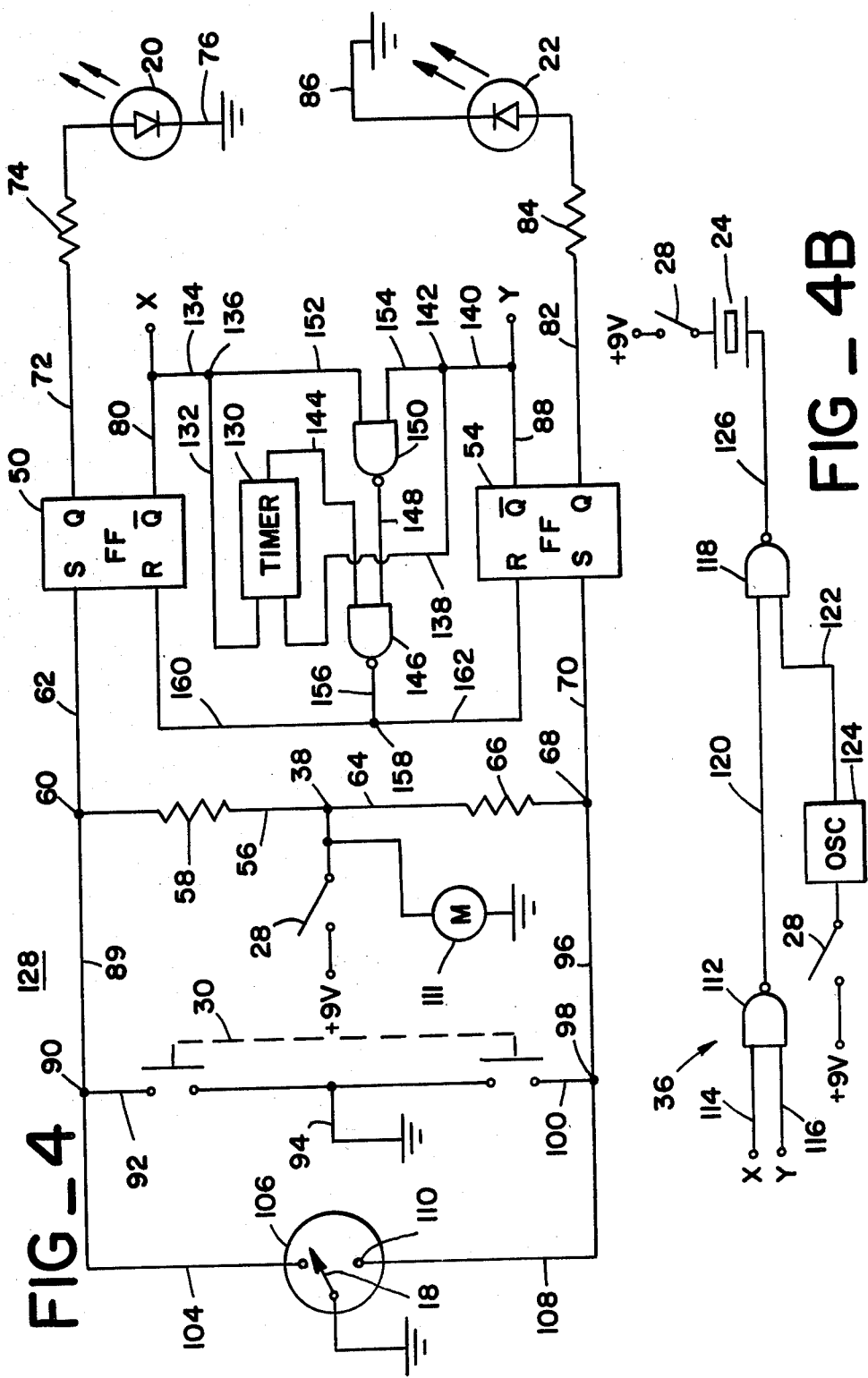

TOY FOR DETECTING MAGNETIC FIELDS WITH ELECTRICAL COMPASS CONTACTS

DESCRIPTION

1. Technical Field

This invention relates to a toy which is educational and which can be used for new party games. More particularly, the present invention relates to a toy which is magnetically operated and teaches the principles of magnetism.

2. Background Art

Many toys are available which are magnetically controlled to perform a function. Typically, the toy has a magnetically actuated switch that is turned on when, for example, a permanent magnet is moved into proximity to the toy. An electrical circuit is then closed to, for example, turn on a light, such as is shown in U.S. Pat. No. 3,223,412 and U.S. Pat. No. 3,798,883.

While the above patented toys inherently teach some principles of magnetism, they are designed primarily as a toy to be used for enjoyment. These toys inherently teach the existence of magnetic fields and their use in actuating a magnetically controlled member, but do not teach other principles of magnetism such as the direction of lines of force and strength of a magnetic field. Furthermore, these patented toys are designed to be used enjoyably in only one particular way; that is, the patented toys are used by children by bringing a magnet into proximity to magnetic switches to turn on a light.

SUMMARY OF THE INVENTION

It is an object of the present invention to provide a novel toy.

Another object of the present invention is to provide an educational toy which can teach a plurality of magnetic principles.

A yet further object of the present invention is to provide a toy which can be used to play a variety of games.

These and other objects of the present invention are attained through the use of a toy that has a housing, a compass with a magnetic needle mounted on the housing, first and second energizable means mounted on the housing for generating alarm signals, and electronic circuit means having contacts which are respectively closed in response to the compass needle being pivoted in one or another direction to energize a respective alarm signal.

BRIEF DESCRIPTION OF THE DRAWINGS

FIG. 1 is a plan view of the present invention.

FIG. 2 is a view taken along lines 2—2 of FIG. 1.

FIG. 3A is a schematic drawing of one embodiment of the electronic circuit of the present invention.

FIG. 3B is a schematic drawing of an additional circuit of the electronic circuit of the one embodiment.

FIG. 4A is a schematic illustration of another embodiment of the electronic circuit of the present invention.

FIG. 4B is a schematic illustration of an additional circuit of the electronic circuit of FIG. 4A.

DESCRIPTION OF THE PREFERRED EMBODIMENTS

FIGS. 1 and 2 illustrate a toy 10 which has a portable housing 12 that can be hand-held and that also can be supported on a table by rubber legs 13. A front or top panel 14 of the housing 12 has a compass 16 with a pivotally mounted magnetic needle 18. A light emitter 20 and a light emitter 22, such as LED's are on opposite sides of the compass 16 to provide a visual signal, and a sound generator 24, such as a commonly known bender, is positioned on the front panel 14 to generate an audible signal. An antenna 26 is rotatably mounted on the front panel 14 and serves no purpose other than the appeal to a child of a movable antenna when the toy 10 is in use.

A power-on toggle switch 28 is on the front panel 14, as are a momentary test button 30 and a manual reset momentary button 32. Button 30 is used to test the power supply and the LED's 20 and 22, together with the bender 24, to determine if the toy 10 is operative. Reset button 32 is used to reset the electronic circuit to be described below after testing the toy 10.

FIG. 3A shows an electronic circuit 34 for energizing the LED 20 and LED 22, whereas FIG. 3B shows an electronic circuit 36 for energizing the bender 24. Circuit 34 shows a +9 V supply, which may be a conventional 9-volt battery, that is coupled to a junction 38 through the power-on switch 28. A line 40 having a resistor 42 and a junction 44 leads via the manual reset button 32 to ground over a line 46.

A line 48 is coupled to the junction 44 and to a reset input R of a flip-flop or a latch 50, and a line 52 is coupled to the junction 44 and to a reset input R of a flip-flop or latch 54. A line 56 having a resistor 58 is coupled to the junction 38 and, via a junction 60, to a line 62 leading to the set input S of the flip-flop 50. Another line 64 having a resistor 66 is coupled to the junction 38 and, via a junction 68, to a line 70 leading to the set input S of the flip-flop 54.

Flip-flop 50 has an output Q coupled to a line 72 which is connected through a resistor 74 to one terminal of the LED 20. The other terminal of the LED 20 is coupled over a line 76 and a line 78 to ground via the line 46. The output $\bar{Q}$ of the flip-flop 50 is coupled over a line 80 to a terminal X.

Flip-flop 54 has an output Q coupled over a line 82 which leads through a resistor 84 to one terminal of the LED 22. The other terminal of the LED 22 is connected over a line 86 to the line 78 and line 46 to ground. The output $\bar{Q}$ of the flip-flop 54 is connected over a line 88 to a terminal Y.

A line 89 is connected from the junction 60 and through a junction 90 to a line 92 which can be closed by the test button 30. Line 92 is connected to ground via a line 94 when button 30 is closed. A line 96 is connected to the junction 68 and via a junction 98 to a line 100 which is closed by the test button 30. Line 100 is connected to ground via the line 94 when button 30 is closed.

The compass needle 18, as shown in FIG. 3A, is connected to ground over a line 102. The circuit 34 has a line 104 leading from the junction 90 to a normally open contact 106 which can be closed by pivoting of the needle 18 in one direction. A line 108 is connected between the junction 98 and a normally open contact 110 which can be closed by pivoting of the needle 18 in the other direction.

FIG. 3A also shows a motor 111 which can be energized by the +9 V supply on closure of the switch 28 to rotate the antenna 26. However, since this could be too much of a drain on the +9 V supply, the antenna 26 possibly should not be used. Alternatively, the antenna 26 can be fixed on the housing 12.

The circuit 36 of FIG. 3B has a NAND gate 112 having one input coupled over a line 114 which is coupled to the terminal X, and another input over a line 116 which is coupled to the terminal Y. A NAND gate 118 has one enabling input coupled to the output of the gate 112 over a line 120 and another input coupled over a line 122 to an oscillator 124 which is energized by the +9 V supply upon closing of the power-on switch 28. The output of the gate 118 is supplied over a line 126 as an AC signal used to energize the bender 24.

To operate the toy 10, assume that the normally open contacts 106 and 110 are open and the power-on switch 28 is then closed. To test the toy 10, the test button 30 is closed to complete the following two circuits. One circuit is made from the +9 V supply, through the switch 28 and junction 38, to the line 56, junction 60, line 89, junction 90, line 92 and line 94 to ground. With this ground connection, line 62 is drawn low to set the flip-flop 50 and make its output Q high and output $\overline{Q}$ low. The other circuit is completed through the +9 V supply, switch 28, junction 38, line 64, junction 68, line 96, junction 98, line 100 and line 94 to ground. This ground connection draws line 70 low to set the flip-flop 54 and make its output Q high and output $\overline{Q}$ low.

Since flip-flop 50 is set, a circuit is completed via line 72, LED 20, line 76, line 78, and line 46 to ground, whereby the LED 20 is energized. Similarly, with flip-flop 54 being set, a circuit is completed via line 82, LED 22, line 86, line 78, and line 46 to ground, whereby LED 22 is energized.

Since the $\overline{Q}$ outputs of flip-flop 50 and flip-flop 54 are low, line 80 and line 88 are low. Consequently, line 114 and line 116 are both low, so that gate 112 is enabled to provide a high on line 120 to enable gate 118. Therefore, the AC signal from oscillator 124 is gated through gate 118 to energize the bender 24. Thus, when the power switch 28 is turned on and the test button 30 depressed, LED's 20 and 22 will be energized, as will bender 24, to indicate that the toy 10 is operative.

In order to reset the circuit 34 and circuit 36, the reset button 32 is then depressed. This couples the +9 V supply through the switch 28, junction 38, line 40, including junction 38, button 32 and line 46 to ground. As a result, line 48 and line 52 are drawn low to reset the flip-flop 50 and flip-flop 54. Thus, line 72 and line 82 become low so that LED 20 and LED 22 are turned off. Also, line 80 and line 88 go high so that line 114 and line 116 of circuit 36 go high, whereby the output of gate 112 on line 120 goes low to disable gate 118. Thus, the bender 24 also is turned off.

Next, to use the toy 10, assume that two external magnets (not shown), for example bar magnets, are strategically positioned on opposite sides of the toy 10 and spaced along a path. The user will carry the portable toy 10 along the path toward these bar magnets. As the toy 10 is moved into proximity to one of these bar magnets, the compass needle 18 will be attracted to the north pole of this one magnet and pivot in one direction so as to close one of the contacts, for example, contact 106. Therefore, a circuit now is completed from the +9 V supply, through closed switch 28, junction 38, line 56, junction 60, line 89, junction 90, line 104, contact 106, needle 18 and line 102 to ground. The line 62 will be drawn low to set the flip-flop 50. Since flip-flop 50 is set, the LED 20 will be lit as described above. Also, with flip-flop 50 being set and flip-flop 54 being in its reset state, line 80 will be low and line 88 will be high. Therefore, line 114 will be low and line 116 will be high so that the output of gate 112 on line 120 will be high to enable gate 118. The output of oscillator 124 on line 122 will then be gated through gate 118 to energize the bender 24.

Then, the toy 10 can be moved along the path away from the one bar magnet. The button 32 then can be depressed to reset the flip-flop 50 in the manner already described. The LED 20 will then be turned off as will the bender 24.

Thereafter, the toy 10 can be moved further along the path until it is in proximity to the other strategically located magnet. The needle 18 will be attracted to the north pole of the other magnet and will pivot in the other direction to close the contact 110. A circuit is then completed from the +9 V supply to the switch 28, junction 38, line 64, junction 68, line 96, junction 98, line 108, contact 110, needle 18 and line 102 to ground. Line 70 is therefore drawn low to set the flip-flop 54. As a result, in the manner described above, the LED 22 will be lit. Also, since flip-flop 54 is set and flip-flop 50 is in its reset state, line 88 is low and line 80 is high. Consequently, line 114 is high and line 116 is low so that the output of gate 112 enables gate 118 to energize the bender 24. Thereafter, the reset button 32 can be closed to reset the flip-flop 54 and turn off the LED 22 and bender 24.

FIG. 4A illustrates a circuit 128 which is an alternative to the circuit 34. As will be described, circuit 128 provides for an automatic reset while circuit 34 is manually reset with button 32. Therefore, if circuit 128 is used, button 32 is not required. FIG. 4B shows the circuit 36 which is identical to the circuit 36 of FIG. 3B and is used with the circuit 128. Like reference numerals are used in FIGS. 4A and 4B to show like elements in FIGS. 3A and 3B.

Circuit 128, in addition to the same components indicated by the same reference numerals as shown for circuit 34, has a timer 130 having one triggering input connected to the line 80 from the flip-flop 50 over a line 132 and a line 134 coupled to a junction 136. Timer 130 has a second triggering input connected to the line 88 from the flip-flop 54 over a line 138 and a line 140 coupled to a junction 142.

Timer 130, when triggered, generates a low output pulse of predetermined duration, for example, 5 seconds, over a line 144 as one input to a NAND gate 146. The other input to the gate 146 is supplied over a line 148 which is coupled to the output of a NAND gate 150. Gate 150 has one input coupled to the line 80 over a line 152, the junction 136 and the line 134. Gate 150 has its other input coupled over a line 154, the junction 142 and the line 140 to the line 88.

Flip-flop 50 is reset by the output of the gate 146 which is coupled over a line 156, a junction 158 and a line 160 leading to its reset input. Flip-flop 54 is reset by the output of gate 146 which is coupled over the line 156, the junction 158 and a line 162 leading to its reset input.

In operation, the circuit 128 is tested in the same manner as described for circuit 34. With the switch 28 being closed, upon closure of the momentary test button 30, flip-flop 50 and flip-flop 54 will become set to turn on LED 20 and LED 22. Also, bender 24 will be energized since flip-flop 50 and flip-flop 54 are set.

When flip-flop 50 and flip-flop 54 become set, line 80 and line 88 go low. Consequently, line 152 and line 154 are low so that the output of gate 150 is high as one input to the gate 146. Also, timer 130 is simultaneously triggered when either line 80 or line 88 goes low via respective lines 134, 132 and 140, 138 so that the output pulse on line 144 is low for 5 seconds. After this predetermined time interval, timer 130 times out and the signal on line 144 goes high. Consequently, since line 148 also is high at this time, the output of gate 146 on line 156 goes low to reset both flip-flop 50 and flip-flop 54 via respective lines 160 and 162. The LED's 20 and 22, as well as the bender 24, then will be de-energized.

Assume now that the above-mentioned bar magnets (not shown) are again strategically located on opposite sides of the toy 10 along a path and that the toy 10 is being carried towards one of these magnets. Assume further that one of these magnets is detected so that needle 18 is moved to close contact 106. Therefore, a circuit is completed from the +9 V supply, through switch 28, junction 38, line 56, line 89, junction 90, line 104, contact 106, needle 18 and line 102 to ground. Line 62 is then drawn low to set flip-flop 50, resulting in the LED 20 being lit. Since line 80 is now low, while line 88 remains high, the circuit 36 of FIG. 4B will also simultaneously energize the bender 24.

When flip-flop 50 is set so that line 80 goes low, gate 150 provides a high on line 148 as one input to the gage 146. Also, timer 130 is triggered by the low going pulse on line 132 to provide the low pulse on line 144 for the predetermined duration of 5 seconds. After this predetermined period, line 144 goes high to enable gate 146 and the output on line 156 goes low to reset automatically flip-flop 50. Thus, LED 20 and bender 24 will be de-energized.

Then, when the toy 10 is carried into proximity with the other bar magnet, needle 18 will be pivoted to close the contact 110. Consequently, the circuit is completed from the +9 V supply, to switch 28, junction 38, line 64, junction 68, line 96, junction 98, line 108, contact 110, needle 18, and line 102 to ground. This draws line 70 low to set the flip-flop 54. The LED 22 thus will be lit and line 88 goes low to trigger the timer 130 and cause gate 150 to provide a high on line 148. After the predetermined time of 5 seconds for the pulse from timer 130, line 144 goes high to enable gate 146 and reset the flip-flop 54 via line 156 and line 162. The LED 22 and bender 24 will then be de-energized.

The toy 10 can be used for educational purposes to teach various principles of magnetism and the use of a compass. For example, as already indicated, a teacher can strategically place the two bar magnets on opposite sides of the toy 10 along the above-mentioned path. The toy 10 can then be moved along the path to come first in proximity to one of the magnets whereby contact 106 is closed. The toy 10 can then continue to be moved along the path until it comes in proximity to the other of these magnets to close contact 110.

The toy 10 thus can be used to explain the existence of magnetic fields and their practical use in actuating a magnetically controlled member such as needle 18 to perform work such as energizing visual and audio signals. Moreover, the toy 10 then can be used to explain the direction of lines of force by showing the attraction of the needle 18 to the north poles as well as the use of compasses. Still furthermore, the strength of a magnetic field can be easily taught by using the same strength bar magnets and positioning one further away from one side of the toy 10 than the other so that only the closer magnet will actuate or cause movement of the needle 18.

The toy 10 can also be used as a game. For example, a plurality of bar magnets, for example, 10, can be secretly and strategically hidden throughout a bordered playing field. A player holding the toy 10 near the ground will then have to move through the field with the intent of energizing the LED 20 or LED 22 as few times as possible. The winner would be the player who passed through the field having the lowest score and/or quickest time. If the embodiment of FIG. 3A were used, the player would have to manually reset the circuit 34 each time an LED were energized. If the embodiment of FIG. 4A were utilized, the player would have to wait the predetermined time until the circuit 128 is automatically reset before proceeding through the field.

As another game, such as an Easter egg hunt, the eggs can be hidden from view and the bar magnets, also hidden from view, placed beside the eggs. Each egg hunter can be given a toy 10 which would be used to detect a magnet and hence locate an egg, with the winner being the one who collected the most eggs. Alternatively, the hidden magnets can be placed in models of toy spacecraft UFO's, or "aliens" from outer space, and the toy 10 used as a UFO or alien detector.

As yet one more example of a game, in place of the party game "Pin The Tail On The Donkey," magnets can be placed at both the tail and head of the donkey and the player blindfolded. The winning player could be the one who not only found the tail, rather than the head, but found the tail in the shortest period of time.

Other aspects, objects, and advantages of this invention can be obtained from a study of the drawings, the disclosure, and the appended claims.

We claim:

1. A toy, comprising:
   (a) a housing;
   (b) a compass having a magnetic pivotal needle and being mounted on said housing;
   (c) first and second energizable means for generating first signals, and third energizable means for generating a second signal different from said first signals, each of said first, second and third energizable means being mounted on said housing; and
   (d) electronic circuit means having a first contact and a second contact for energizing, respectively, said first energizable means and second energizable means in response to said needle being pivoted in one or another direction to close said first contact or said second contact, means for energizing said third energizable means in response to energization of said first energizable means or said second energizable means, testing means for energizing said first, said second and said third energizable means without said needle closing said first contact or said second contact, and reset means for deenergizing said first, said second and said third energizable means.

2. A toy according to claim 1 further comprising: an antenna rotatably mounted on said housing; and wherein said electronic circuit means includes means for rotating said antenna.

3. A toy according to claim 2 wherein said first signals are light signals and said second signal is an audible signal.

4. A toy, comprising:
   (a) a housing having a front panel.
   (b) a compass having a magnetic pivotal needle and being mounted on said front panel.

(c) a first visual signal generator being mounted on said front panel;
(d) a second visual signal generator being mounted on said front panel;
(e) an audible signal generator being mounted on said housing;
(f) electronic circuit means, having a first contact and a second contact and being mounted inside said housing, for energizing said first visual signal generator or said second visual signal generator in response to said needle being pivoted in one or another direction to close said first contact or said second contact, respectively, and for energizing said audible signal generator in response to said first contact or said second contact being closed by said needle;
(g) test switch means, mounted on said housing, for controlling said electronic circuit means to energize simultaneously said first visual signal generator, said second visual signal generator and said audible signal generator; and
(h) means for resetting said electronic circuit means to de-energize said first visual signal generator, said second visual signal generator and said audible signal generator.

5. A toy according to claim 4 wherein said means for resetting comprises a manual reset button being mounted on said housing.

6. A toy according to claim 4 wherein said means for resetting comprises: means for electrically automatically resetting said electronic circuit means a predetermined time after energization of said first visual signal generator or said second visual signal generator to de-energize said first signal generator and said second signal generator.

* * * * *